3,463,782
7,10-ETHANO-1-THIA-4,7-DIAZASPIRO[4.5]DECANE
Samuel Elkin and Warren B. Shapiro, Philadelphia, Pa., assignors, by mesne assignments, to the United States of America as represented by the Secretary of the Department of Health, Education, and Welfare
No Drawing. Filed Feb. 6, 1967, Ser. No. 614,004
Int. Cl. C07d 99/10; A61k 27/00
U.S. Cl. 260—293.4      2 Claims

ABSTRACT OF THE DISCLOSURE

The compound 7,10-ethano-1-thia-4,7-diazaspiro [4.5] decane and its hydrochloride salt is synthesized. The compound displays vasomotor, antimalarial (*Plasmodium berghei*) activity, and oxytocic effects, and has an $LD_{50}$ in mice of 210 mg./kg.

BACKGROUND OF THE INVENTION

Field of the invention

The need for an effective antimalarial agent has been clearly established particularly with regards to the present world situation. Of immediate concern is the quest for a new and safe agent to which the strains of *Plasmodia berghei* are non-resistant.

Description of the prior art

Quinine, quinidine, cinchonine, and cinchonidine are the most important alkaloids found in the bark of the cinchona tree. The quinuclidine nucleus, 1-azabicyclo [2.2.2] octane, is present in all of these alkaloids. Because of the wide spectrum of pharmacological responses produced by quinine and the other cinchona alkaloids, there has been a growing interest in the possible therapeutic uses of quinuclidine compounds. Quinuclidine itself, as the hydrochloride salt, has been found to be a potent hypotensive and smooth muscle relaxant.

The greatest amount of synthetic work has been done on 3-substituted quinuclidines. Series of esters of 3-quinuclidinol have been prepared. All of these esters produced a marked spasmolytic activity.

Several 3-substituted derivatives of quinuclidine have been reported to stimulate the central nervous system.

Numerous other therapeutically active derivatives of quinuclidine have been prepared and pharmacological activity has been found in both mono- and di-substituted products. Ganglionic blocking was produced by 2,3-disubstituted derivatives.

A series of 4-phenyl substituted compounds has been synthesized for investigation as possible analgesics.

The thiazolidine nucleus is present in many therapeutically active compounds. Their activities include antibiotics, central nervous system depressants, antispasmodics, and analgesics. Thiazolidine derivatives have also been utilized as protectants against ionizing radiations and for regenerating keratinic cells.

It is evident from the foregoing that the many derivatives of quinuclidine and of thiazolidine which have been synthesized, produce a wide variety of therapeutic activity.

The bark of the cinchona tree contains over twenty alkaloids. The most important ones are quinine, quinidine, cinchonine and cinchonidine, all of which contain the quinuclidine nucleus. The varied pharmacological activities shown by the cinchona alkaloids underline the importance for further study of quinuclidine compounds.

Quinuclidine was first synthesized in 1909 by Löffler and Stietzel. Formaldehyde was condensed with γ-picoline and the resulting 4-hydroxyethylpyridine was reduced to 4-hydroxyethylpiperidine. Subsequent replacement of the hydroxyl group with iodine, using hydriodic acid, gave the corresponding 4-iodoethylpiperidine which underwent ring closure in ether solution using dilute alkali to form quinuclidine hydroiodide.

A further synthesis of quinuclidine consists of decarboxylating 2,4-lutidinic acid, obtained by the oxidation of 2,4-lutidine, and reducing the resulting pyridine-4-carboxylic acid with sodium and alcohol. Esterification of the product affords ethyl piperidine-4-carboxylate, which is condensed with ethyl chloracetate to give ethylpiperidine-1-acetate-4-carboxylate. Dieckmann cyclization followed by decarboxylation yields 3-ketoquinuclidine, which on reduction by the Wolff-Kishner or Clemmensen methods gives quinuclidine.

Interest in quinuclidine and its derivatives has been fairly recent. Although this molecule was first synthesized in 1909, it received little attention until World War II. At that time, because of the shortage of quinine and the need for substitutes, quinuclidine became an important investigational tool in the chemistry of synthetic antimalarials.

Quinine and other cinchona alkaloids are derivatives of quinuclidine. Therefore, the synthetic methods used in this group of alkaloids are mainly concerned with the reactions and synthesis of the quinuclidine portion of the quinine structure.

Only in the last decade have uses other than antimalarial been suggested for quinuclidine compounds.

SUMMARY OF THE INVENTION

It is an object of this invention to synthesize a new pharmacologically active derivative of quinuclidine, specifically 7,10-ethano-1-thia-4,7-diazaspiro [4.5] decane, and its hydrochloride salt.

It is a further object of this invention to provide a new method for synthesizing a new pharmacologically active derivative of quinuclidine, specifically 7,10-ethano-1-thia-4,7-diazaspiro [4.5] decane, and its hydrochloride salt.

DESCRIPTION OF THE PREFERRED EMBODIMENTS 7,10-ethano-1-thia-4,7-diazaspiro [4.5] decane may be reperesented as follows:

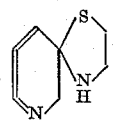

The equation for the production of its hydrochloride salt by condensation of 3-quinuclidone hydrochloride with 2-aminoethanethiol hydrochloride in dry benzene is as follows:

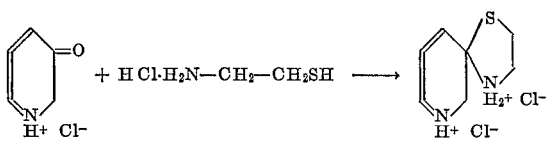

EXAMPLE I

Into a 300 ml. round-bottomed flask equipped with a stirrer, condenser, drying tube, and heating mantle was added 1.36 gm. (.02 mole) of 2-aminoethanethiol hydrochloride and 150 ml. of dry benzene. This mixture was heated until solution was complete and 1.88 gm. (.02 mole) of 3-quinuclidone hydrochloride was added. The mixture was refluxed, with stirring, for twenty hours during which time a white precipitate formed. The mixture was filtered and the filtrate discarded. The residue was recrystallized three times from dry methanol and anhydrous ether to yield a white, crystalline product. Yield 4.0 gm. (77.8%); M.P. 250–255° C.

*Analysis.*—Calcd. for $C_9H_{18}N_2SCl_2$: C, 42.02; H, 7.05; N, 10.89; S, 12.47; Cl, 27.57. Found: C, 42.00; H, 7.23; N, 10.61; S, 12.42; Cl, 27.51.

EXAMPLE II

Vasomotor and Respiratory Activity

Compound tested.—7,10-ethano-1-thia-4,7-diazaspiro [4.5] decane dihydrochloride.

Introduction.—If a vasoactive drug is administered I.V. to an anesthetized dog, usually it will effect the blood pressure. This change in blood pressure can be measured by a Bourdon transducer attached to a physiograph.

If a drug which affects respiration is administered, this can be recorded by an impedance pneumograph attached by electrodes to the skin on the chest of the animal.

Procedure.—A female dog was anesthetized with an I.P. injection of sodium pentobarbital in a dose of 30 mg./kg. of body weight. The animal was strapped down to a bench and the hair was shaved from the neck region. A thin, longitudinal strip of skin in the middle of the neck was cut with a scalpel to expose the longitudinal muscles and these were separated along the midline with a blunt forceps. The left carotid artery located in the carotid sheath beside and slightly below the trachea was exposed. A ligature was tied around the artery craniad and a loose ligature was placed around the artery toward the animal's heart. A bulldog clamp was placed on the most central portion (beyond the loose ligature) of the artery. During this procedure the entire exposed area was washed with 10% sodium citrate solution. Then, a fluid-filled system for recording blood pressure was prepared. The system included a Bourdon blood pressure transducer attached to a sodium citrate filled glass cannula. This cannula, which was inserted into the artery, leads to the transducer which detects pressure changes and sends impulses to the recorder. A fluid filled system which included a U-shaped glass tube filled with mercury was used to standardize the blood pressure at intervals to be used as reference points. This was done by squeezing a rubber bulb to change the height of the mercury. After standardization, this manometer-type apparatus was disconnected.

A V-shaped opening was cut halfway through the artery close to the peripheral ligature to allow for adequate insertion space. The artery was placed over the tip of the cannula and the loose ligature was tied securely around the arterital flap on the tip of the cannula. The bulldog clamp was removed and the area was checked for leakage of blood. The stopcock was opened and the pressure was recorded on the physiograph. Respiration was recorded by means of an impedance pneumograph which was attached by a pair of electrodes to the skin on the chest of the animal.

The thigh area of the dog was shaved and the femoral vein exposed. It was cleared of extraneous matter and two ligatures were slipped around the vein. The vein was cut open and a needle was inserted. The above described compound was injected I.V. through the exposed femoral vein. All exposed areas on the dog were kept saturated with the citrate solution.

Results.—In doses of 125, 250, and 300 mg. there was a very short-lived increase in blood pressure. A dose of 400 mg. (32 mg./kg.) caused a moderate decrease in blood pressure lasting 12 minutes. A dose of 500 mg. (40 mg./kg.) caused a decrease in blood pressure lasting 22 minutes.

There was no significant effect on respiration.

EXAMPLE III

Oxytocic activity

Compound tested.—7,10-ethano-1-thia-4,7-diazaspiro [4.5] decane dihydrochloride.

Three female guinea pigs were injected subcutaneously in the inguinal region with 0.2 mg. of an aqueous suspension of estradiol 24 hours prior to the experiment. Each uterus was excised and a strip (approximately the upper ⅔ of one horn) was attached to a muscle lever and suspended in 100 ml. beaker filled with aerated Tyrode's solution at 38° C. This temperature was maintained throughout the experiment. The results were then recorded on a revolving smoked drum.

Results.—The compound, in a concentration of 25 mg. per 100 ml. of solution, had a pronounced stimulating action on three estrous uterine strips causing the isolated segments to contract and increase in tone and motility. Administration of quinine bisulfate in a concentration of 25 mg. per 100 ml. of solution had no effect on the uterus while subsequent administration of 25 mg. per 100 ml. of the compound again had a pronounced stimulatory action.

EXAMPLE IV

Mendel-Osborne rats, 7-day old litters, were inoculated by intraperitoneal injection of erythrocytes from mice infected with Plasmodium berghei. The control rats received Methocel (0.5%) in volume quantities equal to the solution containing the drugs. The drug was administered subcutaneously (1 or 2 mg./kg.) on days 1 (of inoculation) 2, 3, and 4. Blood smears were taken on days 5 to 7, 8 to 10, 11 to 17, 18 to 23, 24 to 30 and 31 to 35. The percentage parasitemia was calculated from three or more fields under microscope.

The results are shown in Table 1.

| Litter No. (total rats) | Dose (mg./kg.) | Duration of survival/percent peak parasitemia | | | | | | | |
|---|---|---|---|---|---|---|---|---|---|
| | | Control | | | | Drug treated | | | |
| 11 (8) | 2 | 15/33 | 15/28 | 21/50 | 23/72 | 45+/0 | 45+/0 | 45+/0 | 45+/0 |

+Rats surviving at the time table was prepared.

The LD$_{50}$ in mice for the herein described compound is 210 mg./kg., which is approximately twice the LD$_{50}$ of quinine (108 mg./kg.). Therefore, this new compound has a relatively high therapeutic ratio.

Having thus described our invention, we claim:

1. The compound represented by the following formula:

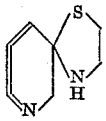

2. The compound represented by the following formula:

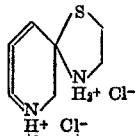

References Cited

Thesis entitled "New Derivatives of Quinuclidine" presented to faculty of Temple U. School of Pharmacy, Warren Barry Shapiro, February 1966, pp. 7, 8, 10, 12, 14, 15, 31, title page, signature page, and acknowledgement.

Chem. & Pharm. Bull., vol. 10, January-June 1962, Taguchi et al., pp. 245–46.

Chemical Abstracts, vol. 49, October-November 1955, p. 13250g., Rubtson et al.

Proceedings of 1st International Pharmacol. Meeting, vol. 7, ed. by K. J. Brunings, 1963, author Mashkousky, pp. 359–66.

HENRY R. JILES, Primary Examiner

S. D. WINTERS, Assistant Examiner

U.S. Cl. X.R.

260—999